(12) United States Patent
Lam et al.

(10) Patent No.: US 6,553,027 B1
(45) Date of Patent: Apr. 22, 2003

(54) APPARATUS AND METHOD FOR CASCADING MULTIPLE NETWORK SWITCH DEVICES

(75) Inventors: Ian Lam, Daly City, CA (US); Eric Tsin-Ho Leung, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/315,971

(22) Filed: May 21, 1999

(65) Prior Publication Data (65)

(51) Int. Cl.[7] .......................... H04Q 11/00; H04L 12/56
(52) U.S. Cl. ........................................ 370/386; 370/396
(58) Field of Search ................................. 370/299, 354, 370/356, 386, 388, 396, 398, 423, 395, 258, 389, 218, 412, 360

(56) References Cited

U.S. PATENT DOCUMENTS

| 5,412,653 | A | * | 5/1995 | Hoppe et al. ................ 370/360 |
| 5,515,376 | A | | 5/1996 | Murthy et al. |
| 5,542,048 | A | * | 7/1996 | Olnowich et al. ..... 395/200.15 |
| 5,557,266 | A | * | 9/1996 | Calvignac et al. ..... 340/825.02 |
| 5,821,875 | A | * | 10/1998 | Lee et al. .................... 370/352 |
| 5,872,787 | A | * | 2/1999 | Cooperman et al. ........ 370/412 |
| 5,909,564 | A | * | 6/1999 | Alexander et al. .......... 395/311 |
| 5,999,518 | A | * | 12/1999 | Nattkemper et al. ........ 370/258 |
| 6,026,088 | A | * | 2/2000 | Rostoker et al. ............. 370/395 |
| 6,104,696 | A | * | 8/2000 | Kadambi et al. ............ 370/218 |
| 6,115,387 | A | * | 9/2000 | Egbert et al. ................ 370/423 |
| 6,128,654 | A | * | 10/2000 | Runaldue et al. ........... 709/219 |
| 6,246,680 | B1 | * | 6/2001 | Muller et al. ................ 370/389 |
| 6,289,021 | B1 | * | 9/2001 | Hesse .......................... 370/409 |
| 6,295,281 | B1 | * | 9/2001 | Itkowsky et al. ........... 370/293 |
| 6,317,429 | B1 | * | 11/2001 | Nakata et al. ............... 370/360 |
| 6,335,938 | B1 | * | 1/2002 | Chiang et al. ............... 370/458 |
| 6,405,258 | B1 | * | 6/2002 | Erimli et al. ................ 370/235 |
| 6,463,032 | B1 | * | 10/2002 | Lau et al. .................... 370/218 |
| 6,480,490 | B1 | * | 11/2002 | Merchant et al. ........... 370/389 |
| 6,483,844 | B1 | * | 11/2002 | Erimli ......................... 370/428 |

OTHER PUBLICATIONS

Doganata, Y.N. "Effects of Cascading on the Performance of a Switching System". Global Telecommunications Conference, 1992. pp. 1493–1497, vol. 3. Dec. 6–9, 1992.*

* cited by examiner

*Primary Examiner*—Hassan Kizou
*Assistant Examiner*—Anh-Vu H Ly

(57) ABSTRACT

An arrangement and method of operating a network switch arrangement in a packet switched network connects a plurality of multiport network switches which is in a circular, serial manner so that data is transferable between the network switches only unidirectionally. When it is determined that data is to be transmitted from a first network switch to a port in a second network switch, the data is transmitted over an expansion bus from the first network switch to the second network switch in a continuous stream of data bursts. This extremely fast transmission between the networks switches allows multiple multiport network switches to be cascaded together to effectively form a single network switch with at least twice as many ports.

31 Claims, 9 Drawing Sheets

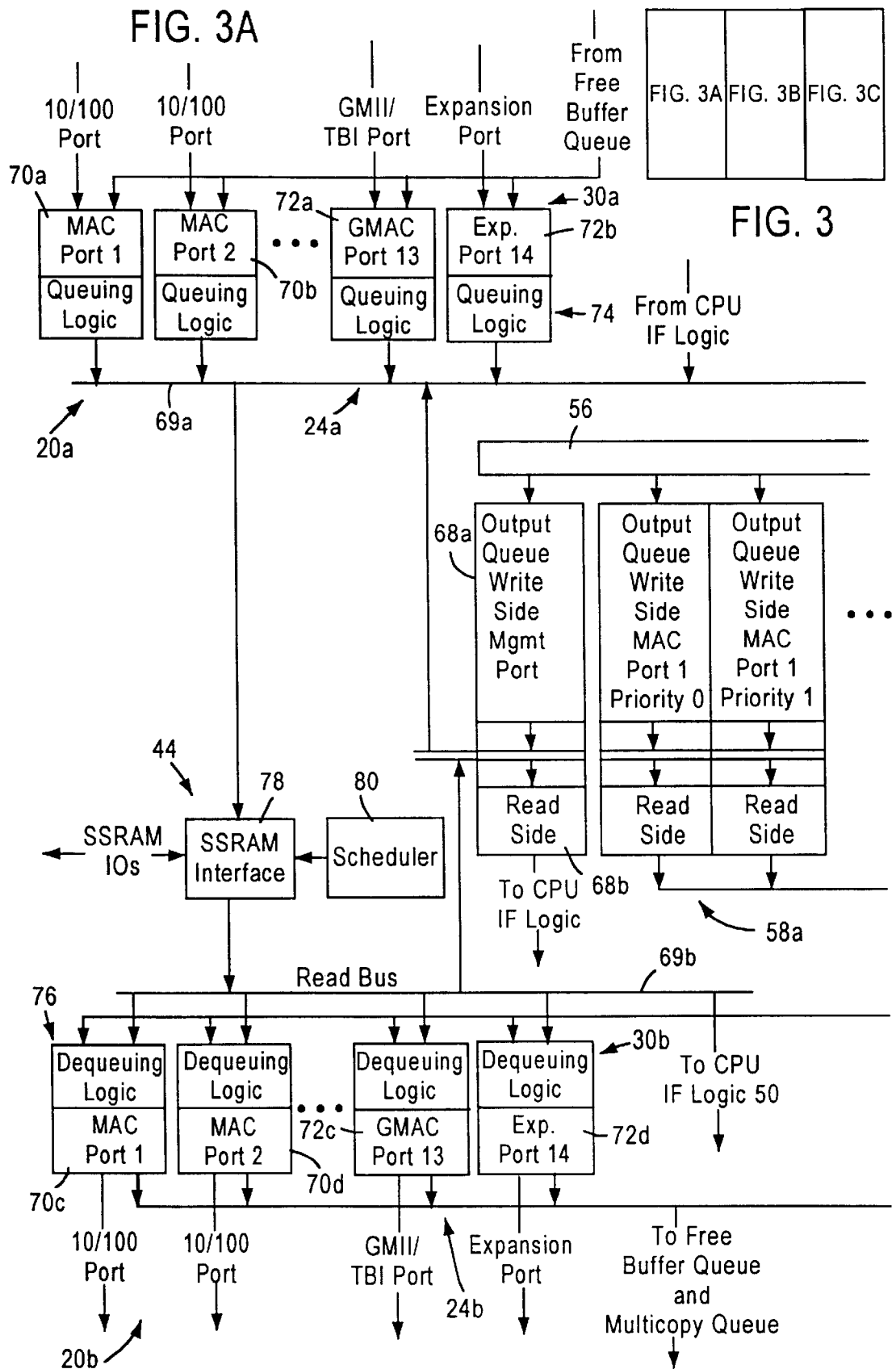

APPARATUS AND METHOD FOR CASCADING MULTIPLE NETWORK SWITCH DEVICES

FIELD OF THE INVENTION

The present invention relates to computer network interfacing and switching, and more particularly, to an apparatus and method for cascading multiple multiport network switches to increase the number of ports in a network switching arrangement.

BACKGROUND ART

Local area networks use a network cable or other media to link stations on a network. Each local area network architecture uses a media access control (MAC) enabling network interfaces at each station to share access to a medium.

The Ethernet, protocol (IEEE Std. 802.3) defines a half-duplex media access format that permits all stations to access the network media channel with equality. Traffic is not distinguished or prioritized over the media. Each station includes an Ethernet interface that uses carrier-sense multiple-access with collision detection (CSMA/CD) to listen for traffic on the media. Any station can attempt to contend for the channel by waiting a predetermined transmission delay interval after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision. Hence, a transmitting station will monitor the media to determine if there has been a collision due to another station sending data at the same time. If a collision is detected, both stations stop, wait a respective random amount of time, and retry transmission.

A multiport network switch in a packet switching network is coupled to stations on the network through its multiple ports. Data sent by one station on a network to one or more other stations on the network are sent through the network switch. The data is provided to the network switch over a shared access medium according to the Ethernet protocol. The network switch, which receives the data at one of its multiple ports, determines the destination of the data frame from the information contained within the data frame. The network switch then transmits the data from the appropriate port to which the destination network station is connected.

A single network switch may have a number of 10/100 Mb/s ports, such as 12 ports. The use of a single network switch in the Ethernet network may limit the size and speed of the network. The number of end stations connected to the single network switch is limited by the number of ports of the network switch.

Proposals to increase the size of the network by coupling two network switches together through one of the 10/100 Mb/s ports allow data to be transferred from an end station connected to a first network switch to an end station connected to a second network switch. However, since each of the 10/100 Mb/s ports has a MAC for enabling the network interfaces at each station to share access to the medium, the transmission of data between the two end stations through the length between the network switches is relatively very slow. The data would have to be switched by the first network switch, queued and sent over the shared access medium to the second network switch, switched within the second network switch and queued and sent out the correct port of the second network switch to the ultimate destination end station. Furthermore, the transmission rate at the network interface port is limited by the Ethernet protocol. Even if the connection is through a gigabit port, the transmission rate between the network stations is limited by the use of the MAC and the transmission protocol to 1.0 Gb/sec.

SUMMARY OF THE INVENTION

There is need for an arrangement and method for cascading a plurality of multiport network switches of a packet switched network in a manner that does not limit the transmission rate between the network switches, so as to provide an arrangement that more closely simulates a single network switch with an increased number of ports.

These and other needs are met by embodiments of the present invention which provide a packet switched network switch arrangement having first and second packet switching network -O switches. A data connection is provided between the first and second network switches. A controller controls the transmission of data from the first network switch to the second network switch in a continuous stream of data bursts.

One of the advantages of these embodiments of the present invention is the transmission of data between the switches in a continuous stream of data bursts. As stated earlier, according to typical Ethernet protocol, data is sent after waiting a predetermined transmission delay interval after deassertion of the receive carrier on the media, known as the IPG interval. This is due to the shared nature of the transmission medium. Hence, the data is not sent in a continuous stream of data bursts. In the present invention, however, the continuous stream of data bursts provides a much faster transmission of data between the network switches. This fast transmission of data allows the two network switches to effectively serve as a single switch with twice the number of ports as either switch by itself.

The earlier stated needs are met by other embodiments of the present invention which provide a multiport packet switched network switch arrangement comprising a first n-port network switch having an expansion port with a transmit side through which data is transmitted from the first network switch and a receive side through which data is received through which data is received with the first network switch. A second n-port network switch is provided having an expansion port with a transmit side through which data is transmitted from the second network switch and a receive side through which data is received at the second network switch. A first unidirectional expansion bus is coupled between the expansion port transmit side of the first network switch and the expansion port receive side of the second network switch for transmission of the continuous stream of data bursts. A second unidirectional bus is coupled between the expansion port transmit side of the second network switch and the expansion report receive side of the first network switch for transmission of a continuous stream of data bursts.

The use of the unidirectional expansion buses between the expansion ports of first and second network switches provides for fast transmissions of continuous streams of data bursts between the networks switches. Thus, the two end-port network switches may act as a single 2n-port network switch.

The earlier stated needs are also met by another embodiment of the present invention which provides a method of operating an m-port network switch on a packet switch network. The m-port network switch has q network switches, each network switch having n-ports, such that q×n=m. The method comprises the steps of connecting the networks switches in a circular, serial manner such that data is transferable between the network switches only unidirectionally. It is determined in a first one of the network switches that data is to be transmitted from a selected port of second one of the network switches. The data is retrieved from a memory coupled to the first network switch. The data is then transmitted from the first network switch to the second network switch in a continuous stream of data bursts. The data is then transmitted from the selected port of the second network switch.

This method of operating an n-port network switch arrangement is able to operate at a very fast switching rate since the data transmitted between network switches does not have to be sent on a shared transmission medium and may be sent in a continuous stream of data bursts. Furthermore, since MAC's are not required controlling the access to the medium between the network switches, the transmission speed is limited only by the clock rate of the expansion ports. For example, if 16 bits are transferred each clock cycle, and the clock speed for transmitting the data between the network switches is 75 MHz, the transmission rate is approximately 1.2 Gb/sec. This number is greater than the 1.0 Gb transmission rate available at the fastest 1.0 Gb Ethernet protocol ports. By changing the clock rate to 83 MHz, as provided in preferred embodiments of the present invention, the transmission rate is increased to 1.33 Gb/sec. Hence, the transmission between the network switches is not limited by the use of MAC's and a shared transmission medium.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

DETAILED DESCRIPTION OF THE INVENTION

Figure 1:
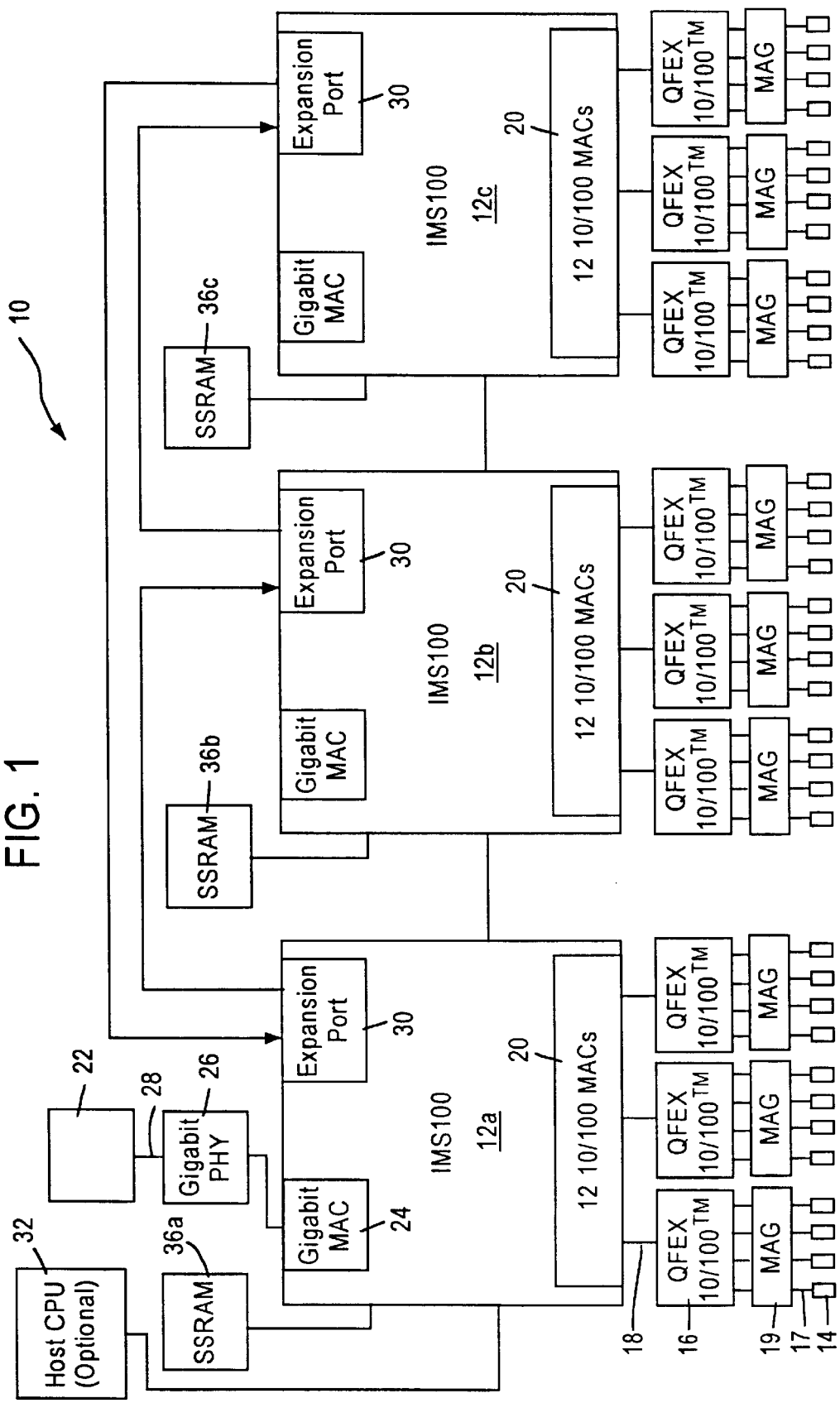
FIG. 1 is a block diagram of a packet switched network including a multiple switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the LPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The fall-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
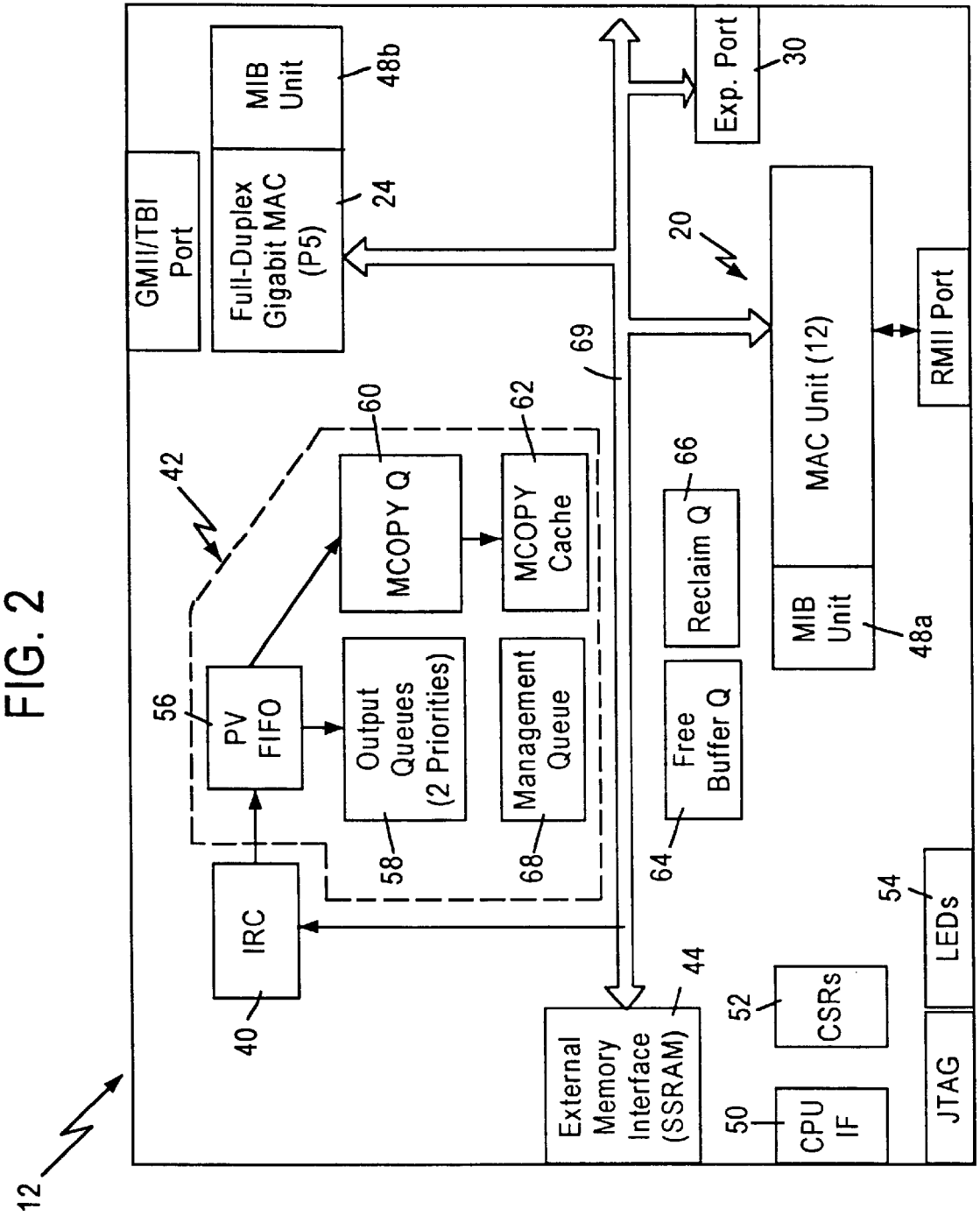
FIG. 2 is a block diagram of a multiport switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48*a* and 48*b* (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 83 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
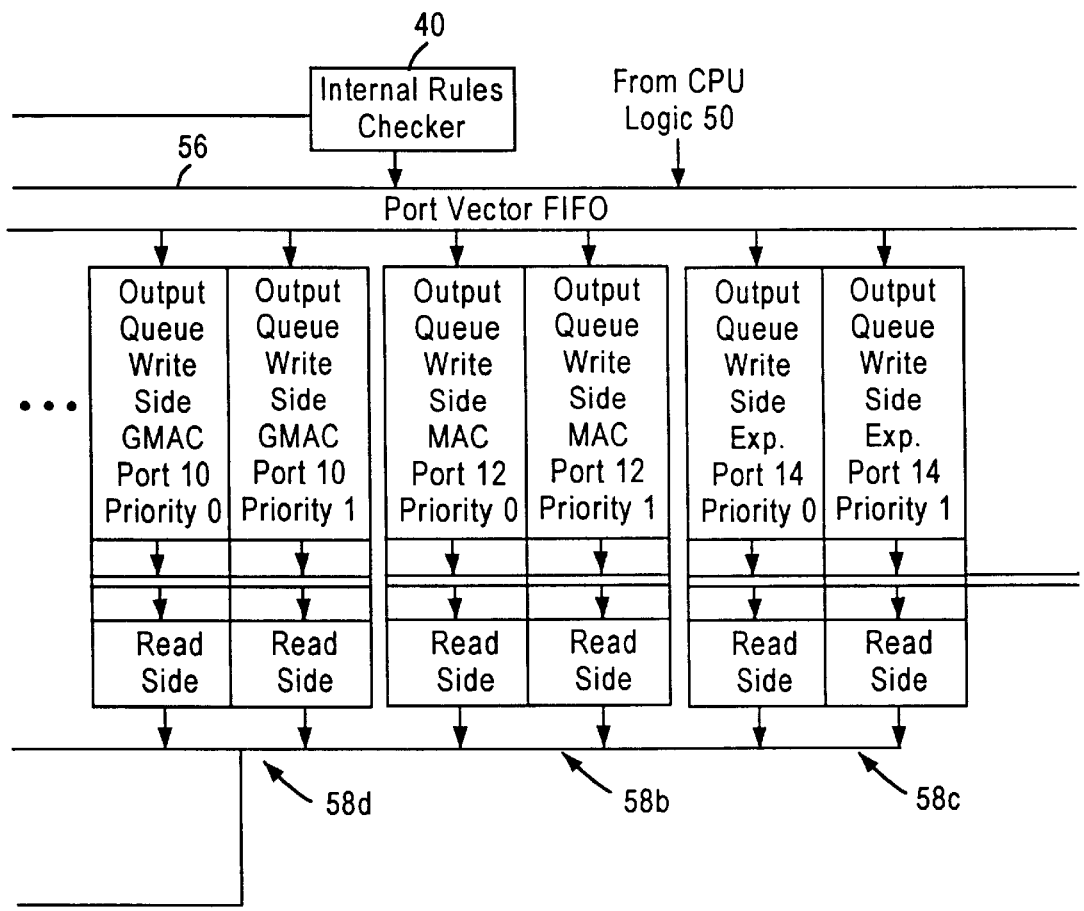
FIG. 3 is a block diagram illustrating in detail the switching subsystem of FIG. 2.
Figure 3C:
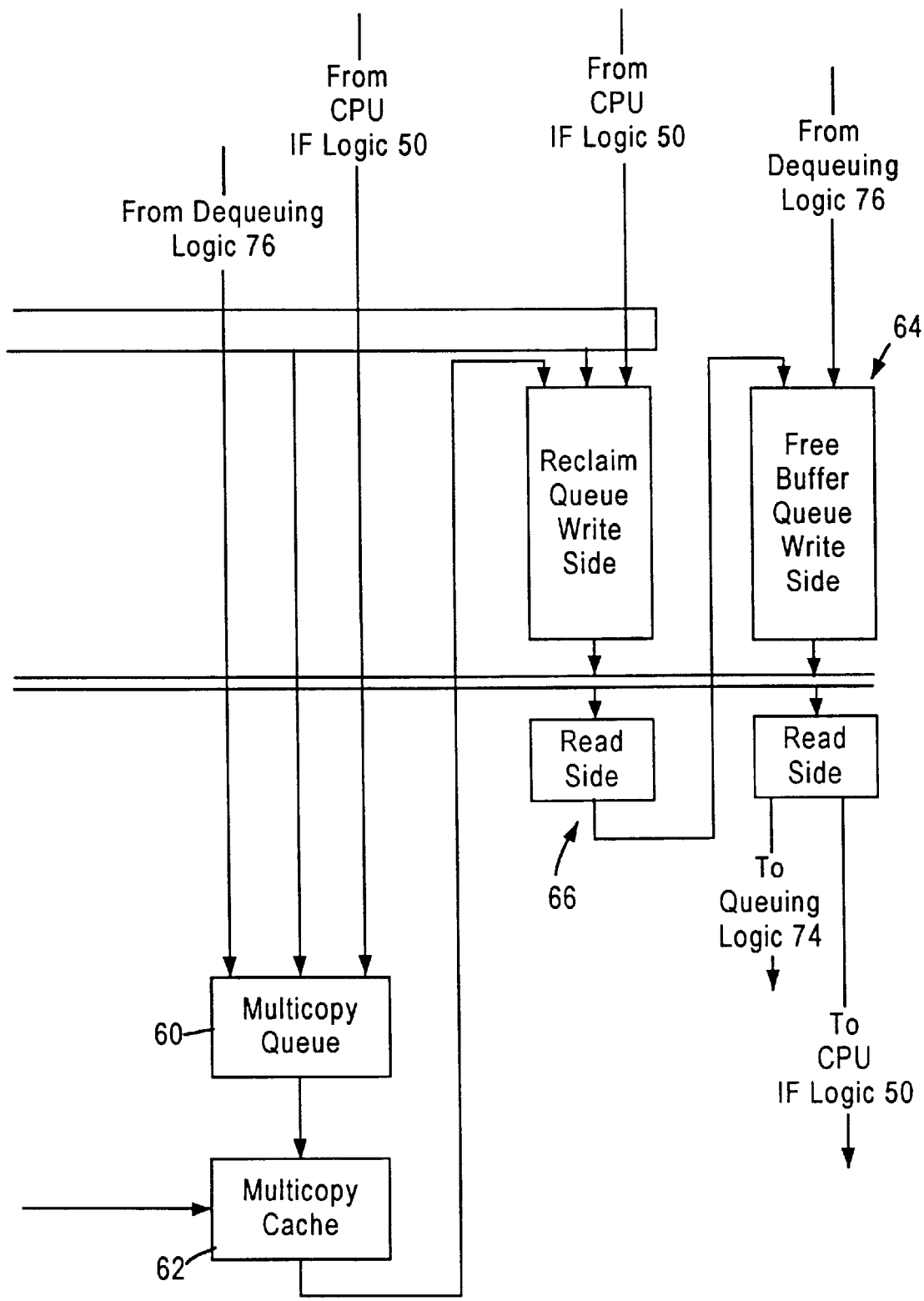

FIG. 3 depicts the switch subsystem 42 of FIG. 2 in more detail according to an exemplary embodiment of the present invention. Other elements of the multiport switch 12 of FIG. 2 are produced in FIG. 3 to illustrate the connections of the switch subsystem 42 to these other elements.

As shown in FIG. 3, the MAC module 20 includes a receive portion 20a and a transmit portion 4b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of an exemplary expansion port 30 will be discussed, followed by the details for transferring data between switches 12.

Expansion Port

Figure 4:
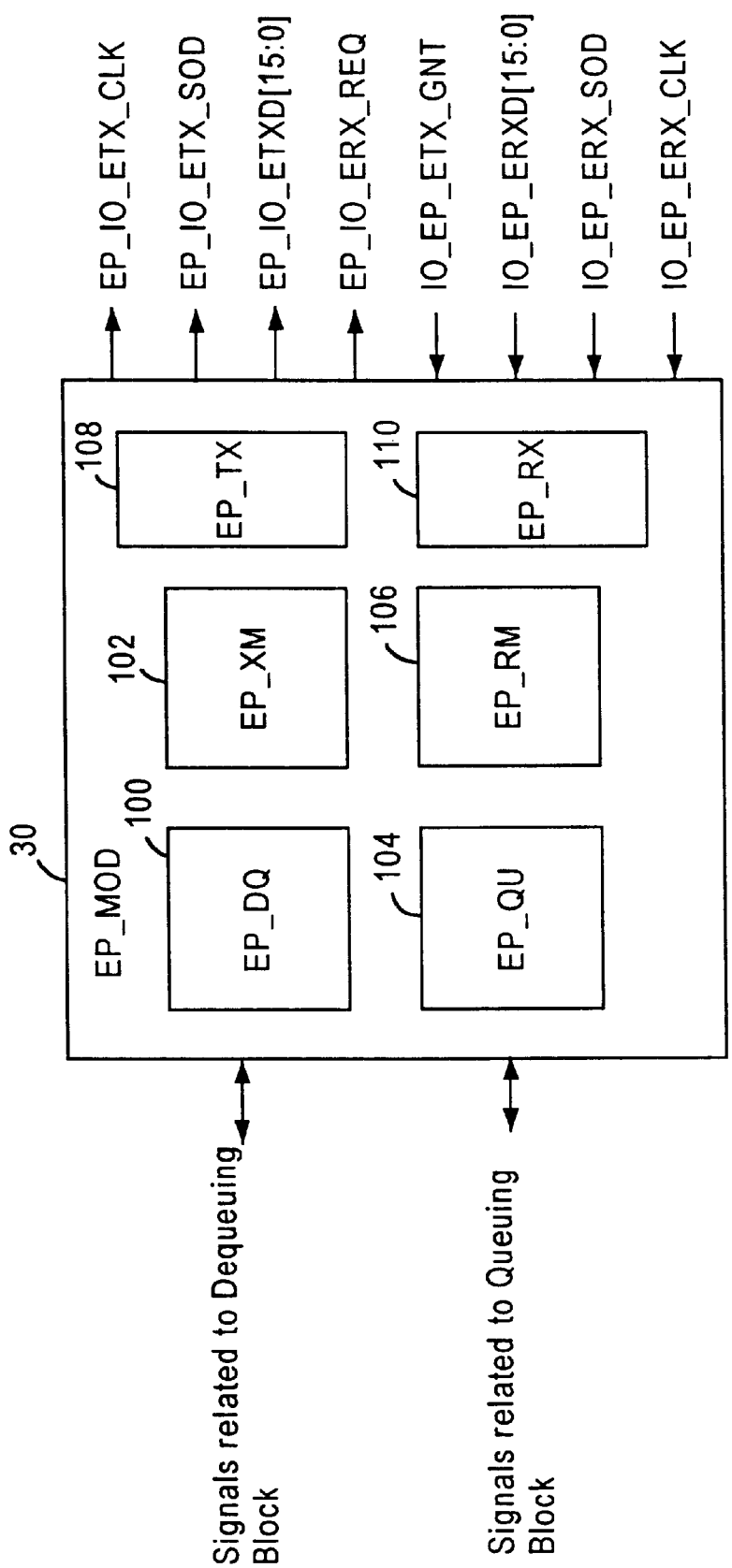
FIG. 4 is a block diagram of an expansion port constructed in accordance with an embodiment of the present invention.
Figure 5:
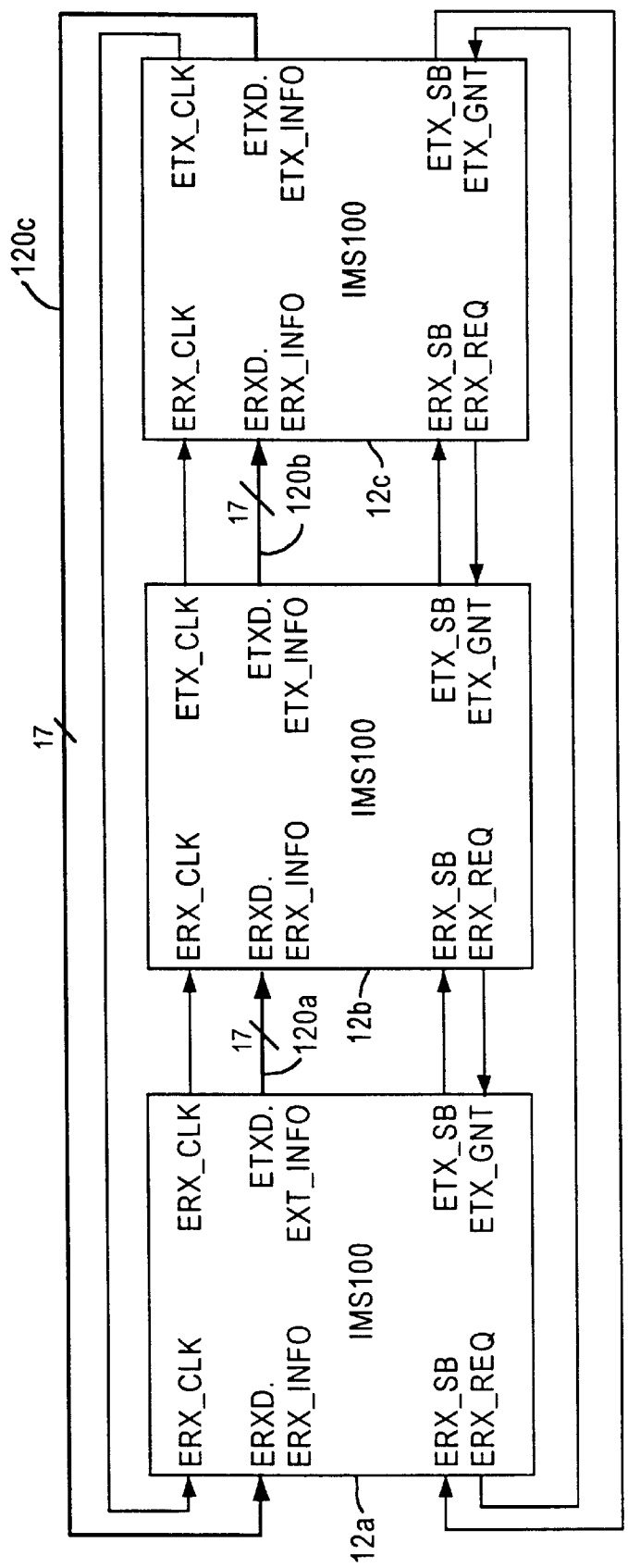
FIG. 5 is a block diagram depicting in more detail the interconnection of a plurality of network switches, in accordance with an embodiment in the present invention.

FIG. 4 illustrates an exemplary block diagram of an expansion port 30 briefly described earlier. The expansion port provides connections to other network switches to allow the cascading of multiple network switches to increase the number of 10/100 Mb/s ports beyond twelve, the number of ports within a single network switch. The expansion port 30 is enabled when a cascade mode bit is set within the switch information register 52 (see FIG. 2). In this mode, the expansion port transmit signals are connected to the expansion port receive signals of the next device in a cascade ring that is formed, as depicted schematically in FIG. 1. FIG. 5 depicts in more detail the expansion port interconnections among three network switches, 12a, 12b and 12c. The transmit signals of switch 12a are connected by unidirectional expansion bus 120a to the receive signals of the second network switch in the cascade ring. Expansion bus is a 17 bit wide bus, in preferred embodiments of the present invention. Sixteen of these bits are for transmitting data, and a seventeenth bit is used for transmitting an information signal, as will be described later. As can be seen from FIG. 5, the network switches 12a, 12b and 12c are connected in a cascade ring fashion so that data flows in only one direction through the ring. Hence, the first network switch 12a may transmit data only to the second network switch 12b, and not directly to the third network switch 12c. However, if data is to be transmitted from a port in 12c, the network switch 12a may send that data through the second network switch 12b and then to the third network switch 12c. The expansion buses 120a, 120b and 120c therefore carry the 16 bit wide data signal ETXD and the one bit-wide information signal ETX_INTO. The clock signal ETX_CLK and receive ERX_CLK is at 83 MHz in the exemplary embodiment. However, by increasing or decreasing the clock rate, the effective transmission rate between the network switches is increased or decreased.

As will be explained in more detail later with respect to the timing diagram of FIG. 6, the strobe signal ETX_SB is asserted by the transmitting network switch 12 before it begins transmitting a burst of data. The expansion port transmitter can send data any time that ETX_GNT is asserted by the downstream network switch. This indicates that space is available in the receive FIFO of the downstream network switch. If the ETX_GNT signal is deasserted during a data transfer, the transmitter pauses at the end of the eight clock burst and resumes transmission when ETX_GNT is asserted again. However, as long as ETX_GNT remains asserted, there will not be any pauses between bursts of data so that the data will be transferred in a continuous stream.

The block diagram of FIG. 4 depicting the exemplary embodiment of expansion port 30 includes a number of different modules within the expansion port 30. The expansion port dequeuing block EP_DQ 100 interacts with the dequeuing logic depicted in FIG. 3 for the expansion port 30. The expansion port queuing block EP_QU 104 that interacts with the queuing logic is also depicted in FIG. 3.

The external memory module EP_XM 102 interacts with external memory 36a and temporarily stores the data retrieved from the external memory 36a through the expansion part dequeuing logic block EPDQ 100. It includes a random access memory (RAM) that is the same size as a receive FIFO in preferred embodiments. A transmit module EP_TX 108 retrieves the data to be transmitted from the transmit module EP_XM 102 and presents them in bursts on the expansion bus in a 16-bit wide burst. The transmit module EP_TX 108 includes a transmit FIFO in certain embodiments. The modules EP_DQ 100, EP_XM 102 and EP_TX 108 together form the transmit side of the expansion port 30.

The receive side of the expansion port 30 is formed by the queuing logic EP_QU 104, the receive memory logic EP_RM 106, and the EP_RX logic 110. The data received from another network switch is first received at the EP_RX logic block 110, which includes a receive FIFO that may be 134 entries long and 18 bits wide, for example. The received information is transferred to the RAM of the EP_RM block 106. The EP_RM 106 block acts as a basic FIFO control and includes a FIFO that has 134 entries that are 18 bits wide and is a dual-port RAM. The received data from the EP_RM 106 is then provided to the queuing logic through the queuing block EP_QU 104.

Figure 7:
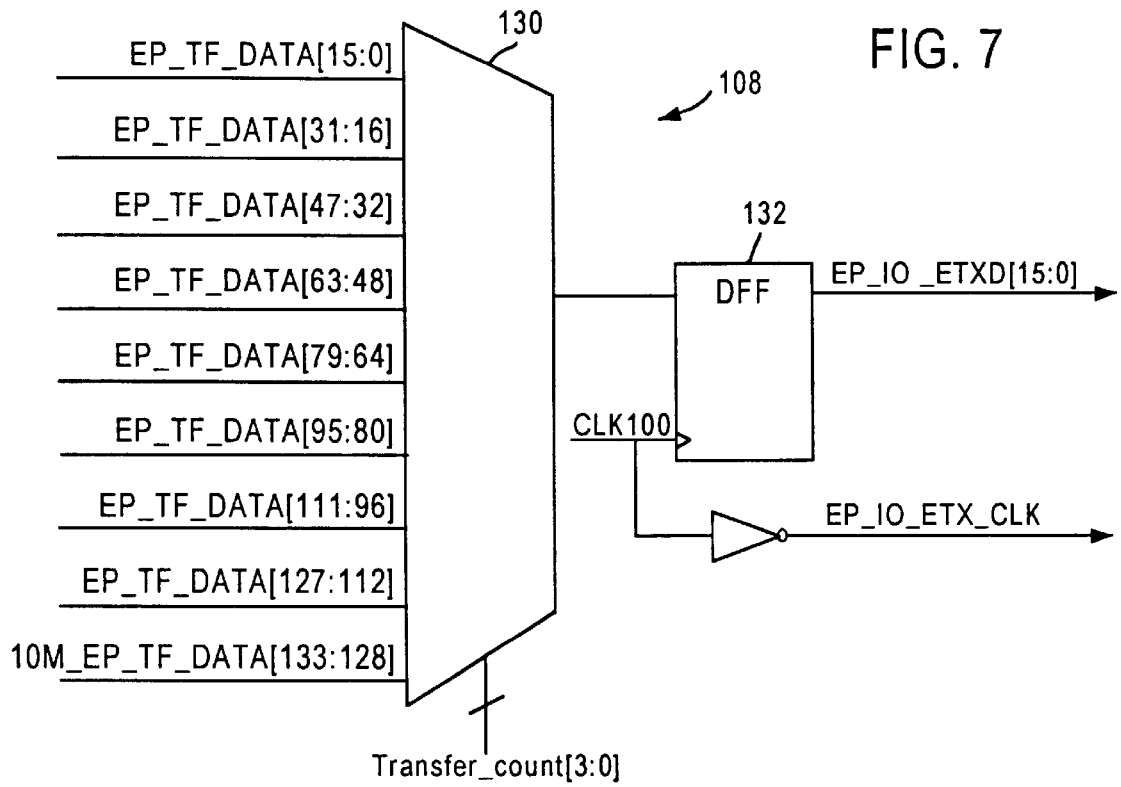
FIG. 7 is a block diagram depicting in more detail data steering logic of the transmission side of the expansion port of FIG. 4, in accordance with an embodiment of the present invention.

FIG. 7 depicts data steering logic within the EP_TX block 108. A multiplexer 130 receives the data as signals EP_TX data from the EP_XM module 102. The transmit data is then provided to the expansion bus through a D flip flop 132 as signal EP_IO_ETXD [15:0]. A D flip flop is clocked by a 83 MHz clock, CLK 83. This clock signal is also provided as a signal to the network switch as a signal EP_10_ETX_CLK. The transfer count, TRANSFER_COUNT [3:0] is a signal that selects which data is being provided from the multiplexer 130 to the D flip flop 132 for transmission. The transfer count starts counting when the start of frame (SOF) is asserted.

Figure 8:
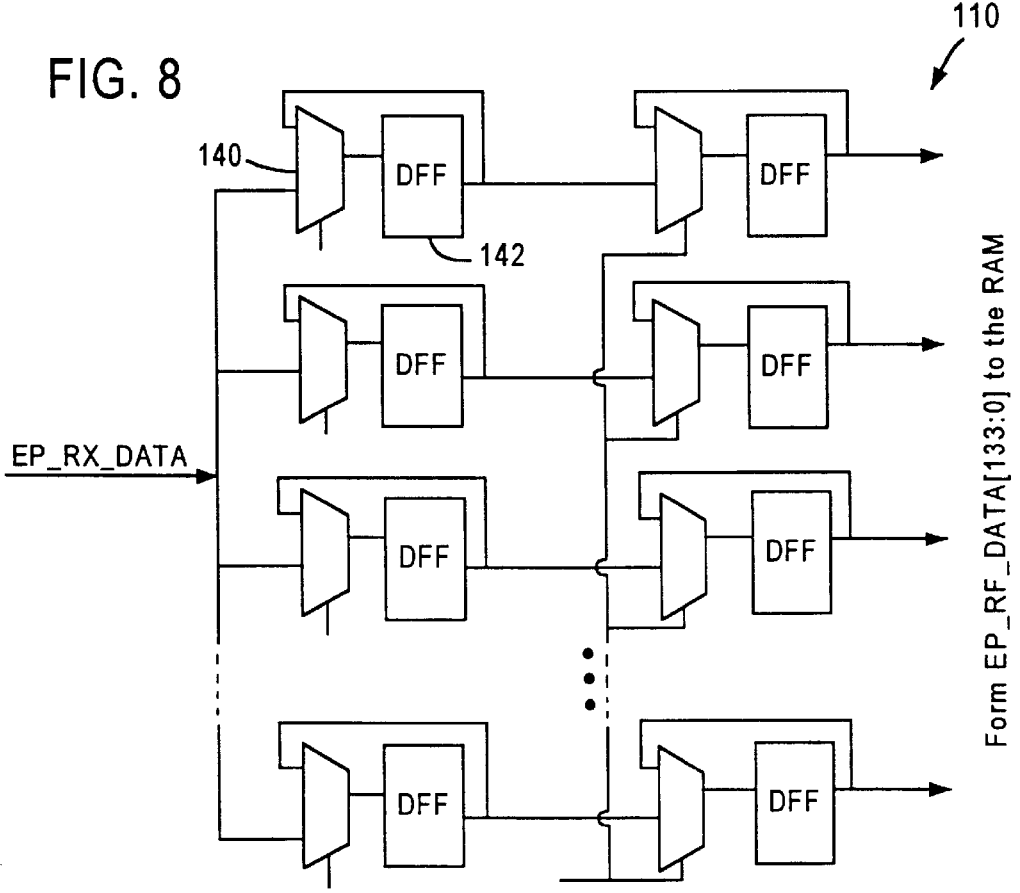
FIG. 8 is a block diagram depicting in more detail a receive module of the receive side of the expansion port of FIG. 4, in accordance with an embodiment of the present invention.

A block diagram of the receive module EP_RX 110 is depicted in an exemplary embodiment of FIG. 8. The module contains a plurality of multiplexers 140 coupled with latches 142 arranged to receive the 16-bit wide data on the expansion bus 120. The EP_RX module 110 gathers the 16-bit wide data together in the D flip flops 142 and forms a signal EP_RF_data [133:0] that is provided to the RAM serving as a receive FIFO within the EP_RM block 106.

When data comes into one of the 10/100 Mb/s ports in one of the network switches, for example, and switch 12a (see FIG. 5) and the logic within the switch, such as the IRC 40, determines that the data needs to be sent to an end station connected to a port in switch 12b, the expansion port 30 is provided with the frame pointer for that frame. The data for that frame has been stored within the external memory SSRAM 36a as described earlier in the general operation of the switch. The EP_DQ block 100 of the expansion port (FIG. 4) provides a write enable and obtains the data from the external memory, SSRAM 36a. This data is provided into the dual port RAM within the EP_XM block 102. A signal FIFO_COUNT counts the number of entries in the dual port RAM and inserts an EMPTY and FULL flag accordingly. With data ready to send, and temporally buffered in the transmit FIFO buffer (the dual port RAM within the EP_XM), it is determined whether the expansion port 30 within the receiving network switch 12b has the capacity to receive the data. If the FIFO_COUNT in the receive memory block EP_RM 106 of the expansion port 30 in the second network switch 12b indicates that the receive FIFO is not full, the receive FIFO is considered to have the capacity to store the data from the transmitting FIFO of the first network switch 12a. The EP_RM block 106 of the second network switch 102 therefore sends a EPIO_ERX_REQ signal to the first network switch 12a to indicate that it currently has capacity to receive the data.

In response to the receipt of the EP_IO_ERX_REQ signal from the second network switch 12b (received as an incoming signal IO_EP_ETX_GNT), the transmitting network switch 12a asserts the ETX_SB signal. This strobe signal informs the receiving network switch 12b that a burst of a data will be following one cycle after the assertion of the ETX_SB signal.

Figure 6:
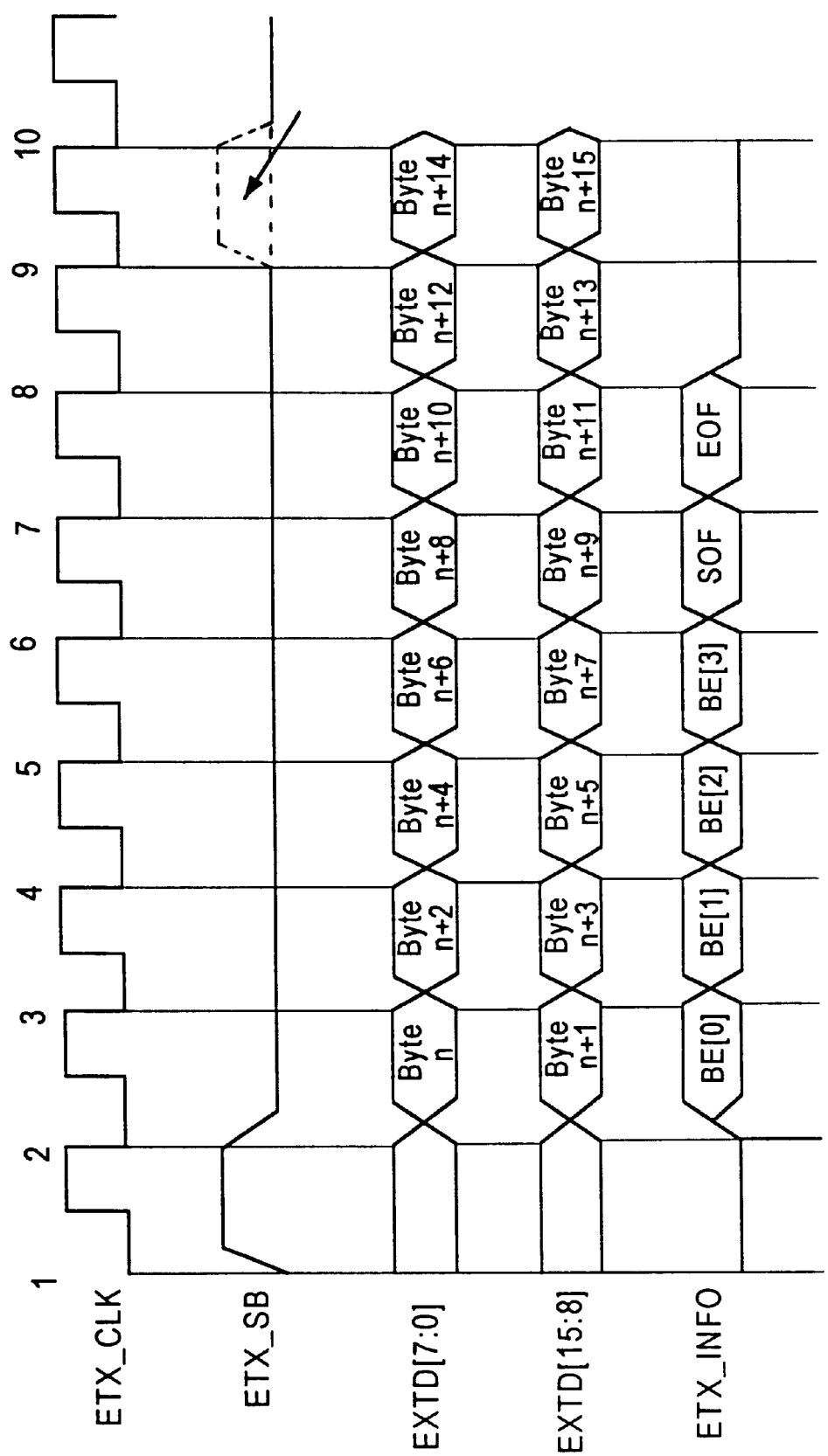
FIG. 6 is an exemplary timing diagram of expansion port signals in accordance with an embodiment of the present invention.

Referring to FIG. 6, depicting an exemplary expansion port timing diagram, the 83 MHz clock ETX_CLK is depicted at the top of the diagram. The strobe signal ETX_SB is strobed by the transmitting expansion port 30 of the first network switch 12a. The data is then transmitted as 16 bits every clock cycle, as signals EXTD [7:0] and EXTD [15:8]. The data is transmitted over the expansion bus 120a.

At the same time as the 16 bits of data are transferred, an information signal is also transmitted on the expansion bus 120a by the expansion port 30 of the transmitting network switch 12a. This information signal, ETX_INFO, is a one-bit signal. The first four bits transmitted of the information signal indicate the number of bits of the frame that are valid. This portion of the information signal, BE [3:0], is transmitted as a four bit signal, one bit in each of the first four clock cycles. In the fifth clock cycle of the data bursts, a start of frame bit (SOF) is sent. This SOF bit, when set, indicates that this burst is the start of a frame. In the sixth clock cycle, an end of frame bit (EOF) is sent. The EOF bit, when set, indicates that this burst contains the end of the frame. As an example, if the final burst of frame data contains 13 bits of frame data, the value of the 6 bits transferred on the ETX_INFO pin would be: BE[3:0]= 1101; SOF=0; and EOF=1. The final two bits of the ETX_INFO signal are always zeros.

As shown in dotted lines in clock cycle 9, if another ETX_SB signal is asserted, a second eight clock burst occurs without any dead time.

The continuous stream of data bursts provided through the expansion port and the method of operation as described above allows the transferred data between network switches to occur much faster than over a shared medium. The rate transfer may be speeded up even further by merely changing the clock signal ETX_CLK. There are no interpacket gaps between data bursts, as is conventionaly with data transfers employing media access controllers (MACs on a shared medium).

With the extremely fast transfer (e.g. 1.3 Gb/sec at 83 MHz) two 12-port network switches may be cascaded together to effectively form a single 24-port network switch. Similarly, three 12 port switches may be cascaded to form a signal 36-port switch, and so on. The present invention thus provides expandability and modularity in the formation of a packet switched network, without incurring extensive switching delays when data is transmitted between ports on different switches.

While this invention has been described with what is presently considered to be the most practical preferred embodiments, it is to be understood that the invention is not limited to the disclosed embodiments, but, on the contrary, is intended to cover various modifications and equivalent arrangements included within the spirit and scope of the appended claims.

What is claimed is:

1. A packet switched network switch arrangement comprising:
    first and second network switches configured to switch packets;
    a data connection between the first and second network switches, the data connection being a unidirectional transmission medium; and
    a controller in each of the first and second network switches that controls transmission of data from the first network switch to the second network switch in a continuous stream of data bursts, wherein
    each of the first and second network switches includes an expansion port that comprises:
        the corresponding controller,
        a transmit first in, first out (FIFO) buffer for buffering data to be transmitted to another network switch, and
        a receive FIFO buffer for buffering data received from the other network switch.

2. The arrangement of claim 1, wherein the controller in said each of the first and second network switches operates at a determined clock speed, with the transmission rate of the data being directly related to the clock speed.

3. The arrangement of claim 2, wherein each of the network switches is an n-port multiport switch, and the arrangement effectively provides a 2n-port multiport switch.

4. The arrangement of claim 3, wherein each unidirectional transmission medium is an m-bit wide expansion bus.

5. The arrangement of claim 4, wherein the controller in said each of the first and second network switches comprises transmit grant signal generation logic for generating a transmit grant signal indicating the capability of a receiving one of the network switches to receive data from a transmitting one of the network switches.

6. The arrangement of claim 5, wherein the indicated capability in the transmit grant signal is a function of a current capacity of the receive FIFO buffer of the receiving one of the network switches.

7. The arrangement of claim 6, wherein the controller in said each of the first and second network switches includes transmit logic responsive to a received transmit grant signal to initiate transmission of the continuous stream of data bursts when the received transmit grant signal indicates the receive FIFO buffer of the receiving one of the network switches currently has capacity to buffer a certain number of data bursts.

8. The arrangement of claim 7, wherein the data bursts are 16 bits wide and 8 clock cycles long, and the number of data bursts in the continuous stream of data bursts is 8.

9. The arrangement of claim 8, wherein the controller in said each of the first and second network switches further includes information signal generation logic that generates an information signal transmitted with the data bursts.

10. The arrangement of claim 9, wherein the information signal contains information indicating the number of bytes in each data burst that are valid.

11. The arrangement of claim 10, wherein the information signal further contains information that indicates whether a data burst contains a start of a frame, and whether a data burst contains an end of a frame.

12. The arrangement of claim 11, wherein m is 17, and the information signal is transmitted on the expansion bus as a single bit wide signal.

13. The arrangement of claim 12, further comprising a third network switch serially connected to the second network switch by another data connection and to the first network switch by still another data connection, the third network switch being configured to switch packets, and each other data connection being a unidirectional transmission medium with data being transmitted unidirectionally from the first network switch to the second network switch, from the second network switch to the third network switch, and from the third network switch to the first network switch.

14. The arrangement of claim 1, further comprising a third packet switching network switch serially connected to the second network switch by another data connection and to the first network switch by still another data connection, the third network switch being configured to switch packets, and each other data connection being a unidirectional transmission medium with data being transmitted unidirectionally from the first network switch to the second network switch, from the second network switch to the third network switch, and from the third network switch to the first network switch.

15. A multiport packet switched network switch arrangement comprising:
a first n-port network switch having an expansion port with a transmit side through which data is transmitted from the first network switch and a receive side through which data is received at the first network switch;
a second n-port network switch having an expansion port with a transmit side through which data is transmitted from the second network switch and a receive side through which data is received at the second network switch;
a first unidirectional expansion bus coupled between the expansion port transmit side of the first network switch and the expansion port receive side of the second network switch for transmission of a continuous stream of data bursts;
a second unidirectional expansion bus coupled between the expansion port transmit side of the second network switch and the expansion port receive side of the first network switch for transmission of a continuous stream of data bursts, wherein
each network switch has an expansion port controller, a transmit first in (FIFO) buffer for buffering data to be transmitted to another one of the network switches, and
a receive FIFO buffer for buffering data received from another one of the network switches.

16. The arrangement of claim 15, further comprising a third n-port network switch interposed between the expansion port transmit side of the second network switch and the expansion port receive side of the first network switch, the third network switch having an expansion port with a transmit side through which data is transmitted from the third network switch and a receive side through which data is received at the third network switch; and
a third unidirectional expansion bus connected between the expansion port transmit side of the third network switch and the expansion port receive side of the first network switch for transmission of a continuous stream of data bursts, wherein the second unidirectional expansion bus is connected between the expansion port transmit side of the second network switch and the expansion port receive side of the third network switch for transmission of a continuous stream of data bursts.

17. The arrangement of claim 16, wherein the expansion port controller comprises transmit grant signal generation logic for generating a transmit grant signal indicating the capability of a receiving one of the network switches to receive data from a transmitting one of the network switches.

18. The arrangement of claim 17, wherein the indicated capability in the transmit grant signal is a function of a current capacity of the receive FIFO buffer of the receiving one of the network switches.

19. The arrangement of claim 18, wherein the expansion port controller includes transmit logic responsive to a received transmit grant signal to initiate transmission of the continuous stream of data bursts when the received transmit grant signal indicates the receive FIFO buffer of the receiving one of the network switches currently has capacity to buffer a certain number of data bursts.

20. The arrangement of claim 19, wherein the data bursts are 16 bits wide and 8 clock cycles long, and the number of data bursts in the continuous stream of data bursts is 8.

21. The arrangement of claim 20, wherein the certain number of data bursts is 8.

22. The arrangement of claim 21, wherein the controller further includes information signal generation logic that generates an information signal transmitted with the data bursts.

23. The arrangement of claim 22, wherein the information signal contains information indicating the number of bytes in each data burst that are valid.

24. The arrangement of claim 23, wherein the information signal further contains information that indicates whether a data burst contains a start of a frame, and whether a data burst contains an end of a frame.

25. The arrangement of claim 24, wherein each expansion bus is 17 bits wide, and the information signal is transmitted on the expansion bus as a single bit wide signal.

26. A method of operating an m-port network switch on a packet switched network, the m-port network switch having q network switches, each network switch having n ports, such that q×n=m, the method comprising the steps of:

connecting the network switches in a circular, serial manner such that data is transferable between the network switches only unidirectionally;

determining in a first one of the network switches that data is to be transmitted from a selected port of a second one of the network switches;

retrieving the data from a memory coupled to the first network switch;

transmitting the data from the first network switch to the second network switch in a continuous stream of data bursts; and transmitting the data from the selected port of the second network switch, wherein each network switch has an expansion port through which data is transmitted and received between the other network switches, the expansion ports including
  a controller,
  a transmit FIFO for buffering data to be transmitted to another one of the network switches, and
  a receive FIFO for buffering data received from another one of the network switches.

27. The method of claim 26, further comprising generating at each network switch a transmit grant signal indicating the capability of the network switch to receive data from another network switch.

28. The method of claim 27, wherein the indicated capability is a function of a current capacity of the receive FIFO of the network switch.

29. The method of claim 28, further comprising initiating transmission of the continuous stream of data bursts by the first network switch when the first network switch is ready to transmit data from its transmit FIFO and receives a transmit grant signal indicating that the receive FIFO of the second network switch currently has capacity to buffer a certain number of data bursts.

30. The method of claim 29, further comprising transmitting an information signal with the continuous stream of data bursts, wherein the information signal contains information indicating the number of bytes in each data burst that are valid, and whether a data burst contains a start of frame, and whether a data burst contains an end of frame.

31. The method of claim 30, wherein q is greater than 2.

* * * * *